(12) United States Patent
Okutsu

(10) Patent No.: US 8,440,817 B2
(45) Date of Patent: May 14, 2013

(54) METHOD FOR PRODUCING METHYL CELLULOSE

(75) Inventor: Munehisa Okutsu, Wakayama (JP)

(73) Assignee: Kao Corporation, Tokyo (JP)

( * ) Notice: Subject to any disclaimer, the term of this patent is extended or adjusted under 35 U.S.C. 154(b) by 262 days.

(21) Appl. No.: 12/810,670

(22) PCT Filed: Dec. 18, 2008

(86) PCT No.: PCT/JP2008/073085
§ 371 (c)(1), (2), (4) Date: Jul. 30, 2010

(87) PCT Pub. No.: WO2009/084452
PCT Pub. Date: Jul. 9, 2009

(65) Prior Publication Data
US 2010/0298555 A1 Nov. 25, 2010

(30) Foreign Application Priority Data

Dec. 27, 2007 (JP) .................. 2007-338054
Mar. 17, 2008 (JP) .................. 2008-068017

(51) Int. Cl.
*C07H 1/00* (2006.01)
*C07H 15/04* (2006.01)
*C08B 1/00* (2006.01)
*C08B 11/00* (2006.01)
*C08B 11/02* (2006.01)

(52) U.S. Cl.
USPC ............. 536/124; 536/56; 536/84; 536/99; 536/120

(58) Field of Classification Search ............ 536/124, 536/99, 84, 56, 120
See application file for complete search history.

(56) References Cited

U.S. PATENT DOCUMENTS
2005/0228174 A1  10/2005  Gillette et al.

FOREIGN PATENT DOCUMENTS

| JP | 55-104221 | 8/1980 |
|---|---|---|
| JP | 61-186336 | 8/1986 |
| JP | 62 236801 | 10/1987 |
| JP | 6-199902 | 7/1994 |
| JP | 8-245701 | 9/1996 |
| JP | 2002 512271 | 4/2002 |
| JP | 2003-64184 | 3/2003 |
| JP | 2004-196783 | 7/2004 |
| JP | 2004-331918 | 11/2004 |
| JP | 2005 255537 | 9/2005 |
| JP | 2005-296906 | 10/2005 |
| JP | 2005296906 A * | 10/2005 |
| JP | 2006 233144 | 9/2006 |

OTHER PUBLICATIONS

Office Action issued on Oct. 19, 2011 in the corresponding Chinese Patent Application No. 200880122895.9 (with English Translation).
Yoichi Ishikawa, et al., "Chemical conversion of cellulose as treated in supercritical methanol", Cellulose, vol. 8, XP-002674463, 2001, pp. 189-195.

* cited by examiner

*Primary Examiner* — Patrick Lewis
*Assistant Examiner* — Everett White
(74) *Attorney, Agent, or Firm* — Oblon, Spivak, McClelland, Maier & Neustadt, L.L.P.

(57) ABSTRACT

The present invention relates to a process for efficiently producing methyl cellulose in an industrially convenient manner. The production process of the present invention includes the step of reacting cellulose with methanol in a subcritical state.

24 Claims, No Drawings

METHOD FOR PRODUCING METHYL CELLULOSE

FIELD OF THE INVENTION

The present invention relates to a process for producing methyl cellulose.

BACKGROUND OF THE INVENTION

Methyl cellulose has been generally produced by the same methods as used for production of other cellulose ethers such as carboxymethyl cellulose. More specifically, methyl cellulose has been produced by the method including the steps of first immersing and mixing a raw cellulose material such as pulps in an aqueous alkali solution containing a large amount of water and an excessive amount of an alkali metal hydroxide such as sodium hydroxide to subject the cellulose to activation treatment, i.e., to so-called cellulose alkalization or mercerization for producing an alkali cellulose, and then reacting the resulting alkali cellulose with methyl chloride as an etherifying agent in a slurry condition, followed by removal of by-products such as neutralized salts by washing, drying and pulverization of the obtained product, etc.

In the cellulose alkalization step, the alkali cellulose obtained by the cellulose alkalization treatment must be subjected to complicated procedures such as washing by filtration and squeezing to remove a surplus amount of alkali or water therefrom. It is considered that a majority of hydroxyl groups contained in a molecule of the cellulose are converted into an alcoholate in the resulting alkali cellulose. In fact, the alkali cellulose contains an alkali in an amount of usually from about 1 to about 3 mol, at least 1 mol, per a glucose unit in a molecule of the cellulose. In addition, the alkali cellulose contains residual, water in an amount equal to or larger than the amount of the cellulose. Therefore, when the alkali cellulose thus obtained is allowed to react with the etherifying agent, water may also be reacted with the etherifying agent, so that not only a large amount of neutralized salts but also those compounds derived from hydrates thereof tend to be by produced.

Further, in the above reaction, since it is required to contact the solid cellulose with the etherifying agent in an efficient manner, the alkali cellulose is usually dispersed in various polar solvents to conduct the reaction in a well-dispersed slurry condition. Examples of the polar solvents added include lower secondary or tertiary alcohol solvents having a relatively low reactivity such as isopropanol, ethers and ketones. For example, in Patent Documents 1 and 2, there is described the method in which a polar solvent such as tert-butanol and methyl isobutyl ketone which is hardly water-compatible, i.e., compatible with only a small amount of water is added upon the cellulose alkalization and the reaction with the etherifying agent, and then the solvent is separated and recovered from a water phase after completion of the reaction.

However, unless any measure for considerably reducing the amounts of the alkali and residual water is taken, it is substantially difficult to reduce amounts of the by-products such as neutralized salts to a large extent.

On the other hand, there is known such an extremely classical method in which an alcohol is reacted with methanol in the presence of a strong acid such as sulfuric acid to obtain a methyl ether. Also, the methods for methyl etherification of 1,2-diols such as ethylene glycol are disclosed, for example, in Patent document 3, etc.

However, when these methods are applied to reactions of compounds having an acid-sensitive functional group such as an aldehyde, undesirable side reactions tend to readily occur. For example, polysaccharides such as celluloses readily undergo breakage of 1,4-glycosyl bond in a main chain thereof, which results in considerable reduction in molecular weight thereof.

Patent Document 4 also discloses the method in which a kaolin-based clay mineral used as a catalyst is filled in a reaction tube, and ethylene glycol and methanol are reacted at a temperature of from 200 to 300° C. while flowing the ethylene glycol and methanol in a liquid phase through the reaction tube.

In addition, Patent Document 5 discloses the method in which a methanol solution of ethylene glycol is reacted in the presence of a solid acid/base catalyst such as alkali metal-phosphorus-silicon-based composite oxides at a temperature which is from 0.9 to 1.5 times a critical temperature (Tc: 239° C. (512 K)) of methanol under a pressure which is from 0.5 to 4.5 times a critical pressure (Pc: 8.1 MPa) of methanol while flowing the solution through a tubular catalyst vessel filled with the above catalyst.

However, even if the method is applied to celluloses, since the celluloses are usually substantially undissolved in methanol, it is difficult to flow these raw materials through the catalyst while being kept in a liquid phase as described above. Further, in the reaction of a batch type, it is extremely difficult to separate the solid catalyst from the celluloses or methyl cellulose that are also in the form of a solid.

Therefore, from the industrial viewpoints, it is very useful to develop a process for catalytically producing methyl cellulose with a less amount of wastes in a convenient and efficient manner.

Patent Document 1: JP 8-245701A
Patent Document 2: JP 6-199902A
Patent Document 3: JP 61-186336A
Patent Document 4: JP 55-104221A
Patent Document 5: JP 2004-196783A

SUMMARY OF THE INVENTION

The present invention relates to a process for producing methyl cellulose by reacting cellulose with methanol in a subcritical state.

DETAILED DESCRIPTION OF THE INVENTION

The present invention relates to a process for producing methyl cellulose in an industrially convenient and efficient manner.

The present inventors have found that when cellulose, preferably a powdery cellulose having a reduced crystallinity, is reacted with methanol kept in a subcritical state, methyl etherification of the cellulose can proceed in an extremely efficient and selective manner.

Thus, the present invention relates to a process for producing methyl cellulose which includes the step of reacting cellulose with methanol in a subcritical state.

The respective components, reaction conditions, etc., which are used in the process of the present invention are explained below.

[Cellulose]

The cellulose used in the present invention is not particularly limited, and is preferably a low-crystalline powdery cellulose. In particular, the low-crystalline powdery cellulose having a cellulose I-type crystallinity of 50% or less is more preferably used.

It is known that celluloses have several kinds of crystal structures, and a crystallinity of each of these celluloses is generally calculated from the ratio of an amount of a crystalline moiety therein to a whole amount of an amorphous moiety partially existing therein and the crystalline moiety. The term "crystallinity" as used in the present invention means a crystallinity of cellulose I derived from a crystal structure of natural celluloses and calculated from a diffraction intensity value determined by a powder X-ray crystal diffraction spectrum analysis, according to Segal method. The crystallinity is defined by the following formula (I):

$$\text{Cellulose } I\text{-type Crystallinity}(\%) = [(I_{22.6} - I_{18.5})/I_{22.6}] \times 100 \quad (1)$$

wherein $I_{22.6}$ is a diffraction intensity of a lattice plane ((002) plane) as measured at a diffraction angle 2θ of 22.6° in X-ray diffraction analysis; and $I_{18.5}$ is a diffraction intensity of an amorphous moiety as measured at a diffraction angle 2θ of 18.5° in X-ray diffraction analysis.

The term "low-crystalline" of the low-crystalline powdery cellulose as used in the present invention means the condition in which the proportion of the amorphous moiety in a crystal structure of the cellulose is large, more specifically, means that the crystallinity calculated from the above formula (1) is preferably 50% or less, and includes the condition in which the cellulose is completely amorphized, i.e., the crystallinity is 0%.

Ordinary powdery celluloses are so-called crystalline celluloses which contain an amorphous moiety in a small amount and whose crystallinity as calculated from the above formula (1) generally lies within the range of from about 60 to about 80%. The crystalline celluloses exhibit an extremely low reactivity for synthesis of ordinary cellulose ethers. On the contrary, the low-crystalline powdery cellulose used in the present invention has an excellent chemical reactivity.

The low-crystalline powdery cellulose used in the present invention may be readily produced from sheet-like or roll-like pulps having a high cellulose purity which are available as general-purpose raw materials. For example, the low-crystalline powdery cellulose may be produced by the methods described in JP 62-236801A, JP 2003-64184A, JP 2004-331918A, etc.

In addition, the low-crystalline powdery cellulose may also be produced, for example, by the method in which chip-like pulps obtained by coarsely crushing sheet-like pulps are treated by an extruder and then further treated by a ball mill.

In the above method, either a single-screw extruder or a twin-screw extruder may be used as the extruder. From the viewpoint of applying a strong compression shear force to the pulps, there may be used those extruders which are provided in any portion of screws thereof with a so-called kneading disk block. The method of treating the chip-like pulps by an extruder is not particularly limited. However, there is preferably used such a method in which the chip-like pulps are charged into the extruder and continuously treated therein.

Examples of the ball mill used in the above method include known ball mills such as a vibrating ball mill, a medium-stirring mill, a rotating ball mill and a planetary ball mill.

The material of balls used as milling media in these ball mills is not particularly limited. Examples of the material of the balls include iron, stainless steel, alumina and zirconia. The outer diameter of the respective balls is preferably from 0.1 to 100 mm from the viewpoint of efficiently amorphizing the cellulose treated. The shape of the milling media used in the ball mills is not particularly limited to a ball shape, but may also be a rod shape or a tubular shape.

The treating time of the pulps in the ball mills is preferably from 5 min to 72 h from the viewpoint of reducing a crystallinity of the cellulose to be treated. The ball mill treatment of the pulps is preferably carried out at a temperature of 250° C. or lower and preferably from 5 to 200° C. to minimize degradation or deterioration of the resulting cellulose due to heat generated upon the treatment. If required, the ball mill treatment may be conducted in an atmosphere of an inert gas such as nitrogen.

According to the above method, it is also possible to well control a molecular weight of the resulting cellulose. More specifically, by using the above method, it is possible to readily produce a powdery cellulose having a high polymerization degree and a low crystallinity which is, in general, hardly available.

The crystallinity of the low-crystalline powdery cellulose used in the present invention as calculated from the above formula (1) is preferably 50% or less. When the crystallinity of the low-crystalline powdery cellulose is 50% or less, the reaction of the cellulose with various etherifying agents can proceed very smoothly. From this viewpoint, the crystallinity of the low-crystalline powdery cellulose is more preferably 40% or less and still more preferably 30% or less. In particular, in the present invention, completely amorphized celluloses, i.e., non-crystalline celluloses having a crystallinity of substantially 0% as calculated from the above calculation formula, are most preferably used.

The polymerization degree of the cellulose, preferably the low-crystalline powdery cellulose, as used in the present invention is preferably from 100 to 2000 and more preferably from 100 to 1000.

The average particle size of the cellulose, preferably the low-crystalline powdery cellulose, as used in the present invention is not particularly limited as long as the cellulose is well dispersed in methanol, and is preferably 300 μm or less, more preferably from 20 to 150 μm and still more preferably from 25 to 50 μm.

[Production of Methyl Cellulose]

The process for producing methyl cellulose according to the present invention is characterized in that cellulose, preferably a low-crystalline powdery cellulose, is reacted with methanol kept in a subcritical state.

The term "subcritical state" of methanol as used in the present invention means such a condition that the reaction temperature and/or reaction pressure are respectively in the ranges lower than the subcritical and supercritical conditions for methanol as defined in the paragraph [0041] of the above Patent Document 5 [namely, the ranges in which the reaction temperature is from 0.9 to 1.5 times a critical temperature of methanol: Tc=512 K (239° C.); and the reaction pressure is from 0.5 to 4.5 times a critical pressure of methanol: Pc=8.1 MPa]. More specifically, the subcritical state of methanol means the condition that the reaction temperature lies within the range which is from 0.88 to 1.0 time the critical temperature: Tc=512 K (239° C.) (i.e., from 450 to 512 K (from 180 to 239° C.), and the reaction pressure lies within the range which is not less than 0.1 time but less than 0.5 time the critical pressure: Pc=8.1 MPa (i.e., not lower than 0.8 MPa but lower than 4.0 MPa). Among them, the reaction temperature used in the present invention is preferably in the range of from 180 to 230° C. from the viewpoint of preventing decomposition of the raw cellulose and the resulting methyl cellulose or occurrence of undesired coloration thereof.

When the reaction temperature and reaction pressure lie within the above-specified ranges, methyl etherification of the cellulose, preferably the low-crystalline powdery cellulose, as used in the present invention can proceed extremely smoothly.

(Methanol/Hydrous Methanol)

In the process of the present invention, there is preferably used either methanol or hydrous methanol.

In the embodiment using methanol, the reaction is preferably carried out in the presence of a catalytic amount of the below-mentioned catalyst.

In the embodiment using hydrous methanol, the methyl etherification of the cellulose with the hydrous methanol can well proceed in the reaction temperature and reaction pressure ranges as defined in the present specification in which methanol is kept in a subcritical state, without using any catalyst. Such a method requiring no catalyst serves for reducing the amount of wastes discharged from the reaction.

The temperature range as defined above in which methanol is in a subcritical state corresponds to such a temperature range which is lower than a subcritical temperature range of water as defined in JP 2002-88000A (from 250 to 350° C.). The above patent document describes that a hydration reaction of an epoxide with water in a subcritical state proceeds without using any catalyst. The reason therefor is considered to be that the reactivity of water itself is considerably enhanced in the above subcritical temperature range of water.

On the other hand, in the embodiment using the hydrous methanol, the reactivity of water, for example, upon a hydration reaction thereof is not considerably improved in the above subcritical temperature range of methanol. However, when the temperature lies within the range of from 180 to 250° C., in particular, in the range of from 200 to 230° C. in which the subcritical temperature range of methanol is involved, an ionic product of water reaches a maximum value. This indicates such a possibility that the reactivity of methanol is considerably enhanced.

More specifically, when the reaction temperature and reaction pressure lie within the ranges in which methanol is kept in a subcritical state, methyl etherification of the cellulose with the hydrous methanol can proceed extremely smoothly without using any catalyst. Meanwhile, in the embodiment of the present invention using the hydrous methanol, the below-mentioned catalyst may also be used in a catalytic amount, if required.

In the present invention, in order to react the cellulose under the condition fully dispersed in methanol or hydrous methanol, the reaction system is preferably stirred by an agitation blade, etc., in an effective manner. From this viewpoint, the amount of methanol or hydrous methanol used is preferably 5 times or more, and more preferably from 10 to 50 times the weight of the cellulose.

The content of water in the hydrous methanol used in the present invention is preferably 20% by weight or less, more preferably from 0.5 to 15% by weight and still more preferably from 1 to 10% by weight on the basis of the weight of methanol in order to allow the reaction to proceed in an efficient manner and avoid occurrence of possible hydrolysis.

(Catalyst)

The catalyst used in the present invention is not particularly limited, and is preferably a metal salt and more preferably a water-soluble metal salt. Examples of the metal salt include alkali metal salts, alkali earth metal salts and aluminum salts of an inorganic acid selected from the group consisting of sulfuric acid, phosphoric acid and boric acid. In addition, the catalyst is preferably in the form of a water-soluble neutralized salt. When using such a water-soluble catalyst, it is possible to readily remove the catalyst after completion of the reaction by distilling off and recovering unreacted methanol and then washing the obtained reaction product with water or with hydrous isopropanol or the like which is ordinarily used for production of cellulose ethers. In general, it is difficult to separate the solid catalyst used for synthesis of methyl cellulose from the solid reaction product. However, if the catalyst used therein is in the form of a water-soluble salt, separation of the catalyst from the solid reaction product is extremely facilitated. Examples of the suitable catalysts include sodium phosphate, cesium phosphate, cesium sulfate, magnesium phosphate, aluminum phosphate and aluminum borate.

It is sufficient that the catalyst is used in a catalytic amount on the basis of the cellulose. More specifically, the catalyst is preferably used in an amount of from 1 to 30% by weight and more preferably from 10 to 25% by weight on the basis of the weight of the cellulose. These catalysts may be used alone or in combination of any two or more thereof.

The reaction of the cellulose with methanol in a subcritical state according to the present invention may be usually carried out in a pressure reaction container such as an autoclave. However, the reaction may also be carried out by flowing a methanol dispersion or hydrous methanol dispersion containing the cellulose and, if required, the catalyst used, through a heated pressure tubular reaction container while being kept in a slurry condition.

Further, when using a mixing device such as a so-called kneader used for kneading resins, etc., as described in JP 2002-114801A, the reaction may also be carried out under the condition heated by a high-temperature medium such as hot oil while controlling the amount of methanol used such that the pressure within the reaction container is lower than a withstanding pressure thereof.

In addition, the production process of the present invention is preferably carried out in such a manner that the cellulose and methanol or hydrous methanol are charged, if required, together with the catalyst, into the reaction container, followed by heating the contents of the reaction container to the temperature range used in the reaction therebetween while stirring. In order to avoid occurrence of undesirable coloration upon the reaction, the reaction is more preferably carried out by heating the reaction system after previously fully purging the reaction container with an inert gas such as nitrogen, if required.

In the methyl cellulose obtained by the production process of the present invention, the methyl group contained therein may be bonded to a hydroxyl group existing at any position of a glucose unit in a molecule of the cellulose. However, the substitution degree of a methyl group per a glucose unit in a molecule of the cellulose can be optionally adjusted by suitably controlling the reaction conditions such as reaction time or reaction temperature, an amount of methanol or an amount of hydrous methanol and water content therein, and an amount of the optionally used catalyst. As a result, the resulting methyl cellulose can be used in extremely extensive applications as a component to be compounded in various compositions.

EXAMPLES (1) Calculation of Crystallinity, Polymerization Degree and Average Particle Size of Cellulose The cellulose I-type crystallinity of the cellulose was calculated from a diffraction spectrum peak intensity which was measured under the following conditions using a "Rigaku RINT 2500VC X-RAY Diffractometer" available from Rigaku Corporation, according to the above calculation formula.

Measuring Conditions:

X-ray source: Cu/Kα-radiation; tube voltage: 40 kV; tube current: 120 mA; measuring range: measured at a diffraction angle 2θ=5 to 45° and an X-ray scanning speed of 10°/min. The sample to be measured was prepared by compressing pellets each having an area of 320 mm² and a thickness of 1 mm.

The polymerization degree of the cellulose was measured by a copper/ammonia method as prescribed in ISO-4312 method.

The average particle size of the cellulose was measured using a laser diffraction/scattering-type particle size distribution measuring instrument "LA-920" available from Horiba Co., Ltd. The measurement was carried out under the following conditions. That is, the particles to be measured were previously subjected to ultrasonic treatment for 1 min, and the volume-based median diameter thereof was measured at 25° C. using water as a dispersing medium upon the measurement. Meanwhile, the refractive index used in the above measurement was 1.2.

(2) Calculation of Substitution Degree of Methyl Group Introduced

The substitution degree represents an average molar number of the methyl group added and introduced per a glucose unit in a molecule of the cellulose, and was calculated as follows. That is, the resulting product was treated with methoxy acetyl chloride in a pyridine solvent to subject a hydroxyl group contained in the product which was not still methyl-etherified to methoxy-acetylation reaction. The resulting methoxy-acetylated product was subjected to $^1$H-NMR spectrum measurement. The substitution degree was calculated from an integral ratio between the signals derived from a methyl proton and a methylene proton in a methoxyacetyl group and the signal derived from a methyl proton in the metyl-etherifed methyl group which were observed in the range of from 3.3 to 4.3 ppm in the $^1$H-NMR spectrum measurement (in a deuterochloroform solvent; on the basis of trimethoxysilane).

Production Example 1

Production of Amorphized Powdery Cellulose

First, a wood pulp sheet (a pulp sheet available from Borregaard Inc.; crystallinity: 74%) was cut into chips using a shredder "MSX2000-IVP440F" available from Meikoshokai Co., Ltd.

Then, the thus obtained pulp chips were charged into a twin-screw extruder "EA-20" available from Suchiro EPA Corporation, and passed through the extruder one time at a shear rate of 660 sec$^{-1}$ and a screw rotating speed of 300 rpm while flowing a cooling water from outside therethrough to thereby obtain a powdery cellulose.

Next, the thus obtained powdery cellulose was charged into a batch-type media-stirring mill "SAND GRINDER" (available from Igarashi Kikai Co., Ltd.) having a container capacity of 800 mL which was filled with 720 g of 5 mmφ zirconia beads at a filling ratio of 25% and fitted with an agitation blade having a diameter of 70 mm. While cooling an outside of the container by a cooling water, the powdery cellulose was treated by the mill at a stirring speed of 2,000 rpm and a temperature of from 30 to 70° C. for 2.5 h, thereby obtaining an amorphized powdery cellulose (cellulose I-type crystallinity: 0%; polymerization degree: 600; average particle size: 40 μm). In the above reaction, there were used undersize particles thereof (90% of the raw cellulose charged) obtained by further passing the powdery cellulose through a 32 μm-mesh sieve.

Example 1-1

A small-size autoclave (30 mL) was charged with 0.50 g of the amorphized cellulose (cellulose I-type crystallinity: 0%; polymerization degree: 600; average particle size: 40 μm) and 9.0 g of hydrous methanol [water content: 0.5 g (5.6% by weight)], and an inside of the autoclave was purged with nitrogen and then deaerated. Then, the contents of the autoclave were heated while stirring as such to 220° C. in a high-temperature oil bath. The initial pressure within the container was 2 MPa. After being continuously stirred as such for 8 h, the resulting reaction mixture was cooled to room temperature. The reaction mixture was distilled off to remove unreacted methanol therefrom, and the obtained product was washed with hydrous isopropanol (water content: 15% by weight) and acetone and then dried under reduced pressure, thereby obtaining methyl cellulose as a light brown solid. As a result of subjecting the thus obtained methyl cellulose to methoxy-acetylation and then subjecting the resulting methoxy-acetylated product to $^1$H-NMR analysis, it was confirmed that the substitution degree of a methyl group in the resulting methyl cellulose per a glucose unit of the cellulose was 2.4, and the reaction therefore proceeded smoothly.

Example 1-2

The reaction was carried out in the same manner as in Example 1-1 except that the stirring time as the reaction time was 16 h. As a result, it was confirmed that the substitution degree of a methyl group in the resulting methyl cellulose per a glucose unit in a molecule of the cellulose was 2.6, and the reaction therefore proceeded very smoothly.

Example 2-1

A small-size autoclave (container capacity: 30 mL) was charged with 0.50 g of the amorphized powdery cellulose (cellulose I-type crystallinity: 0%; polymerization degree: 600; average particle size: 40 μm) obtained in Production Example 1, 0.1 g of sodium phosphate as a catalyst and 10 mL g of methanol, and an inside of the autoclave was purged with nitrogen and then deaerated. Then, the contents of the autoclave were heated while stirring to 220° C. in a high-temperature oil bath. The initial pressure within the container was 2 MPa. After being continuously stirred as such for 16 h, the resulting reaction mixture was cooled to room temperature. The reaction mixture was distilled off to remove unreacted methanol therefrom, and the obtained product was washed with hydrous isopropanol (water content: 15% by weight) and acetone and then dried under reduced pressure, thereby obtaining methyl cellulose as a light brown solid. As a result of subjecting the thus obtained methyl cellulose to methoxy-acetylation and then subjecting the resulting methoxy-acetylated product to $^1$H-NMR analysis, it was confirmed that the substitution degree of a methyl group in the resulting methyl cellulose per a glucose unit of the cellulose was 2.8, and the reaction therefore proceeded very smoothly. In this case, it was also confirmed that the reactivity of the methyl group against all of the hydroxyl groups contained in the cellulose was identical.

Example 2-2

The reaction was carried out in the same manner as in Example 2-1 except for using 0.1 g of cesium phosphate as the catalyst, thereby obtaining methyl cellulose as a light brown solid. As a result, it was confirmed that the substitution degree of a methyl group in the resulting methyl cellulose per a glucose unit in a molecule of the cellulose was 2.0, and the reaction therefore proceeded very smoothly.

Example 2-3

The reaction was carried out in the same manner as in Example 2-1 except for using 0.1 g of cesium sulfate as the catalyst, thereby obtaining methyl cellulose as a light brown solid. As a result, it was confirmed that the substitution degree of a methyl group in the resulting methyl cellulose per a glucose unit in a molecule of the cellulose was 2.0, and the reaction therefore proceeded very smoothly.

Example 2-4

The reaction was carried out in the same manner as in Example 2-1 except for using 0.1 g of magnesium phosphate as the catalyst, thereby obtaining methyl cellulose as a light brown solid. As a result, it was confirmed that the substitution degree of a methyl group in the resulting methyl cellulose per a glucose unit in a molecule of the cellulose was 2.5, and the reaction therefore proceeded very smoothly.

Industrial Applicability

In accordance with the production process of the present invention, methyl cellulose can be produced in an industrially convenient and efficient manner. The methyl cellulose obtained according to the present invention can be used in various extensive applications such as emulsion stabilizers for cosmetics and food, dispersants and suspension stabilizers for building materials, thickeners, adhesives, dispersants and stabilizers for drugs, binders, and protective colloid agents.

The invention claimed is:

1. A process for producing methyl cellulose, comprising the step of reacting cellulose with methanol in a subcritical state, wherein the reaction temperature is in the range of from 180 to 230° C. and the reaction pressure lies within the range which is not lower than 0.8 MPa but lower than 4.0 MPa, and wherein the cellulose is a low-crystalline powdery cellulose having a crystallinity of 50% or less.

2. The process for producing methyl cellulose according to claim 1, wherein the low-crystalline powdery cellulose has a crystallinity of 40%.

3. The process for producing methyl cellulose according to claim 1, wherein the methanol is hydrous methanol.

4. The process for producing methyl cellulose according to claim 3, wherein the methanol has a water content of 20% by weight or less.

5. The process for producing methyl cellulose according to claim 1, wherein the reaction is carried out in the presence of a catalytic amount of a catalyst.

6. The process for producing methyl cellulose according to claim 5, wherein the catalyst is an alkali metal salt, an alkali earth metal salt or an aluminum salt of an inorganic acid selected from the group consisting of sulfuric acid, phosphoric acid and boric acid.

7. The process for producing methyl cellulose according to claim 5, wherein the catalyst is a water-soluble metal salt.

8. The process for producing methyl cellulose according to claim 5, wherein said catalytic amount of said catalyst ranges from 1 to 30% by weight on the basis of the weight of the cellulose.

9. The process for producing methyl cellulose according to claim 1, wherein said low-crystalline powdery cellulose is produced by a process comprising coarsely crushing a sheet-like pulp of cellulose to produce a chip-like pulp of cellulose, extruding the chip-like pulp of cellulose, and further processing with a ball mill.

10. The process for producing methyl cellulose according to claim 9, wherein said extruding is with a single-screw extruder or a twin-screw extruder.

11. The process for producing methyl cellulose according to claim 9, wherein said extruding is with an extruder comprising a kneading disk block.

12. The process for producing methyl cellulose according to claim 9, wherein said ball mill is selected from the group consisting of a vibrating ball mill, a medium-stirring mill, a rotating ball mill and a planetary ball mill.

13. The process for producing methyl cellulose according to claim 9, wherein said processing with a ball mill is for a time of 5 minutes to 72 hours and at a temperature of 250° C. or lower.

14. The process for producing methyl cellulose according to claim 9, wherein said processing with a ball mill is in an atmosphere of an inert gas.

15. The process for producing methyl cellulose according to claim 1, wherein the low-crystalline powdery cellulose has a crystallinity of 30%.

16. The process for producing methyl cellulose according to claim 1, wherein the low-crystalline powdery cellulose has a crystallinity of 0%.

17. The process for producing methyl cellulose according to claim 1, wherein the low-crystalline powdery cellulose has a degree of polymerization ranging from 100 to 2000.

18. The process for producing methyl cellulose according to claim 1, wherein the low-crystalline powdery cellulose has a degree of polymerization ranging from 100 to 1000.

19. The process for producing methyl cellulose according to claim 1, wherein the low-crystalline powdery cellulose has an average particle size of 300 μm or less.

20. The process for producing methyl cellulose according to claim 1, wherein the low-crystalline powdery cellulose ranges from 20 to 150 μm.

21. The process for producing methyl cellulose according to claim 1, wherein the low-crystalline powdery cellulose ranges from 25 to 50 μm.

22. The process for producing methyl cellulose according to claim 1, wherein said reaction temperature ranges from 200 to 230° C.

23. The process for producing methyl cellulose according to claim 1, wherein the amount of methanol in said reaction system ranges from 5 to 50 times the weight of cellulose.

24. The process for producing methyl cellulose according to claim 1, wherein the methanol has a water content of 0.5% to 15% by weight.

* * * * *